C. SCHNEIDER.
AUTOMATIC VALVE.
APPLICATION FILED OCT. 1, 1920.
1,413,938.
Patented Apr. 25, 1922.
2 SHEETS—SHEET 1.
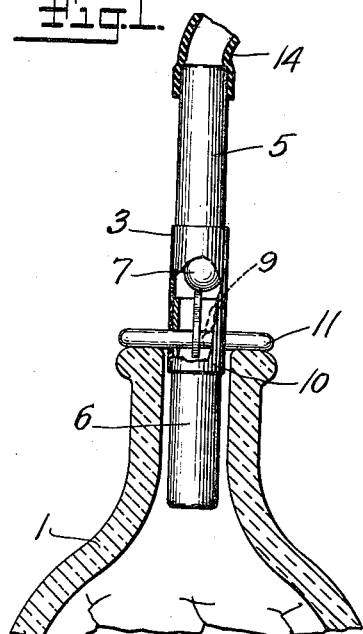
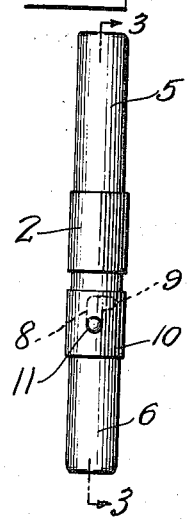
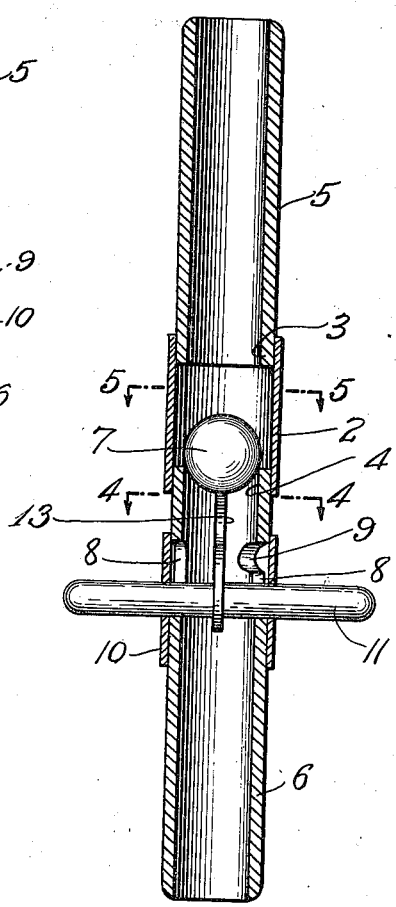
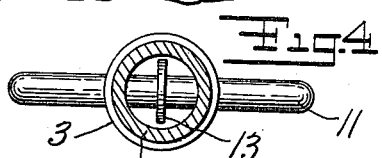
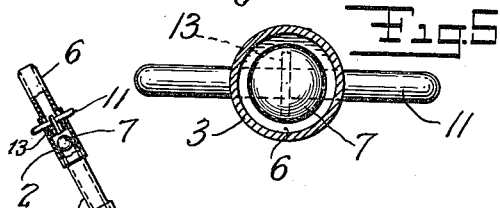
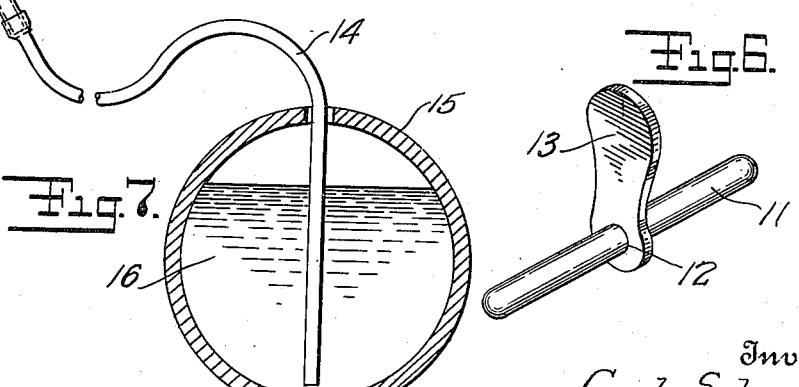
Inventor
Carl Schneider
By his Attorney
Paul M Klein

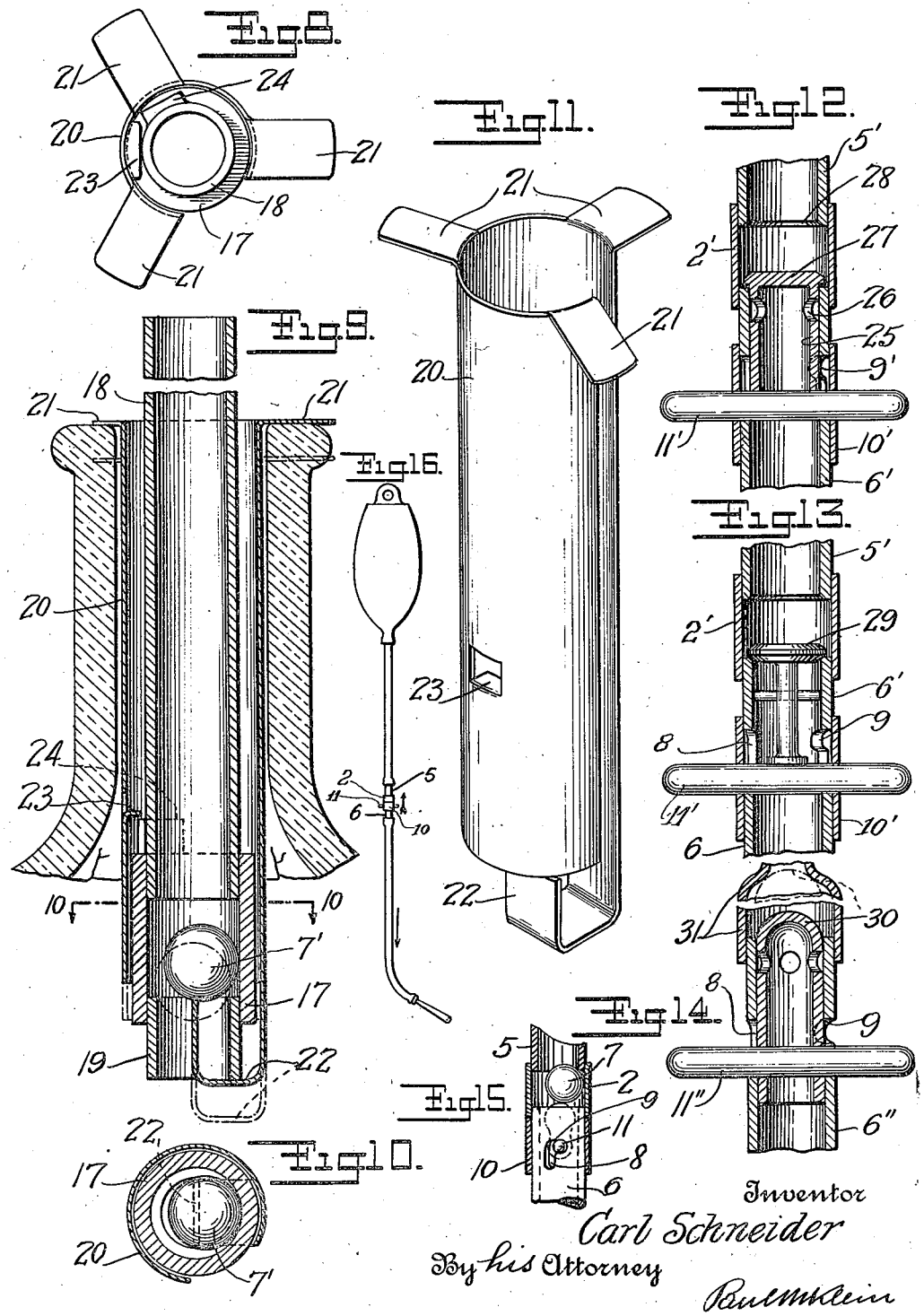

UNITED STATES PATENT OFFICE.

CARL SCHNEIDER, OF NUTLEY, NEW JERSEY.

AUTOMATIC VALVE.

1,413,938.	Specification of Letters Patent.	Patented Apr. 25, 1922.

Application filed October 1, 1920. Serial No. 414,044.

*To all whom it may concern:*

Be it known that I, CARL SCHNEIDER, a citizen of the United States, and resident of Nutley, in the county of Essex and State of New Jersey, have invented certain new and useful Improvements in Automatic Valves, of which the following is a specification.

This invention relates to valves in general and particularly to the kind known as automatic valves.

A few of its many objects are to provide a simple, inexpensive and effective device of this kind which is not only easily understood as to its operation, but which is absolutely dependable in its function and can not get out of order during ordinary use unless forcibly damaged.

Other objects of my invention are to provide such device with features of a double-acting automatic or check valve so designed as to check the flow of liquid in either direction.

Further objects of my invention are to provide a valve operating mechanism, in slidable engagement with the valve housing, adapted to serve as suspension for the latter when desired, and means for arresting said operating mechanism in a position holding said valve open.

These and still other objects will be clearly understood from the following description and the accompanying drawings, showing preferred designs of my invention and forming part of this specification, and in which:

Fig. 1 is an elevation of my device, suspended, and its valve in open position.

Fig. 2 is a side view thereof.

Fig. 3 is a cross sectional elevation taken on line 3—3 of Fig. 2 showing the valve in closed position.

Fig. 4 is a cross sectional plan view taken on line 4—4 of Fig. 3.

Fig. 5 is a cross sectional plan view taken on line 5—5 of Fig. 3.

Fig. 6 is a partial detail view of a preferred form of the valve operating mechanism.

Fig. 7 is a diagrammatic illustration of my device in connection with a siphon and in upturned position preventing the back flow of liquid.

Fig. 8 is a top view of a modified form of my device.

Fig. 9 is a cross sectional elevation of the same.

Fig. 10 is a cross sectional view taken on line 10—10 of Fig. 9.

Fig. 11 is a detail view of the modified valve operating mechanism.

Figs. 12, 13 and 14 are partial illustrations of modified forms of my device.

Fig. 15 is a detail view illustrating means for keeping the valve operating means in a position when holding the valve open.

Fig. 16 illustrates the application of my device in connection with a syringe.

In the drawings the reference character 1 represents a bottle in the neck of which one preferred form of my device is inserted. The latter consists of a valve housing 2 of preferably cylindrical shape, into which protrude the ends 3 and 4 of conduits 5 and 6 respectively.

As may be seen, the housing is of larger internal dimension than are the conduits, their outer diameter being equal to the inner diameter of the housing.

The ends of the conduits extending into the housing form seats for valve 7 which is placed into the housing prior to permanently joining therewith the conduits.

This valve may be a ball as shown in Figs. 1, 3, 5, 7, 9 and 10 or may be made of different shapes few of which are illustrated in Figs. 12, 13 and 14 as will be explained later on.

Referring to the Figures 1 to 7 and 12 to 15, conduit 6 is provided with a pair of opposite, longitudinal slots 8 terminating at their ends nearest to housing 2 in an L-shaped circumferential extension 9.

Surrounding the slots is a slidable cylinder 10 provided with diametrically opposite apertures through which is forced bar or handle 11 passing through the slots and protruding beyond cylinder 10.

The bar 11 is freely movable in slots 8 and 9, while cylinder 10 covers the slots irrespective of the position of bar 11 in the slots.

When forcing bar 11 through the apertures of cylinder 10 and the slots it passes through aperture 12 of pin 13 which is shaped in such a way as to always remain substantially at a diametric center line of conduit 6 (see Figs. 3 and 4).

In Fig. 1 my device is shown connected with the end of a hose 14 and resting, supported by bar 11, on the neck of bottle 1. The weight of the housing and tubular conduits 5 and 6 causes my device to move down in the now stationary cylinder 10 whereby ball 7 is unseated by pin 13. In this position the valve is open and permits any liquid contained in tube 14 to flow through my device. At the moment the device is taken out from the bottle it assumes, due to the combined weight of ball 7, cylinder 10, bar 11 and pin 13, and the head pressure of the liquid, a position shown in Figs. 2 and 3, provided that it is held suspended by conduit 5, and that bar 11 may freely move in longitudinal slot 8 and is not held in peripheral slot 9.

Ball 7 will always seat itself and close one of the openings of the housing when my device is held in any position where the seat provided by one conduit is located substantially below the opposite seat of the other conduit.

In Fig. 7 a vessel 15 containing liquid 16 is disclosed. A siphon conduit 14 passes into the vessel, and attached at its outer end is my device shown in a position reversed to that shown in Fig. 3.

It will be observed that ball 7 is seated at the end of conduit 5 attached within housing 2.

When in this position the ball checks the back flow of liquid contained in pipe 14 when the latter's outer end is lifted above the level of liquid 16 in vessel 15.

My device may be used also as a combined manually operable and check valve similarly to the manner illustrated in Fig. 15. When used in that way, ball 7 may be held in lifted position by first moving bar 11 together with cylinder 10 in longitudinal direction and then turning it into slot portion 9. When the ball is to be seated again, or the flow of the liquid stopped, the operations are reversed, and bar 11 is allowed to drop to the then lowest portion of slots 8.

A modified form of my device is shown in Figs. 8, 9, 10 and 11 differing from the first described construction mainly in the design of the valve opening mechanism.

Again a valve housing is shown, indicated at 17, at the ends of which are secured conduits 18 and 19. Surrounding both housing and conduit 18 is a generally cylindrical mantle 20 having at its upper portion a plurality of extensions 21 disposed at right angles to the mantle body. Continuing from the lower end, an upturned strip 22 is provided and adapted to enter from below into housing 17. A bent-in portion 23 is provided in the mantle and serves as rest for the latter when ball 7' is to be kept unseated. This is accomplished by turning the mantle relative to housing 17 until bent portion 23 rests upon lug 24 forming an extension of housing 17.

The operation of this modified form of my device is very similar to that described in connection with the design shown in Fig. 1, with the exception that mantle 20 with its extensions 21 takes the place of bar 11, and slots 9 are substituted by bent-in portion 23 and lug 24.

As has been said before, ball 7 may be replaced by various other valve designs.

In Fig. 12 a thimble-shaped valve 25 is shown, provided with apertures indicated at 26, and a conical head 27 smaller in diameter than housing 10'.

The head 27 is adapted to engage seat 28 of conduit 5', when used in checking the back flow of liquid. When the valve is lifted by means of bar 11' secured in sliding cylinder 10' liquid passes through apertures 26 into conduit 6.

Similarly to ball 7 operates double seat valve 29 shown in Fig. 13, while the construction of valve 30 in Fig. 14 is somewhat similar to that explained in Fig. 12.

Valve 30 differs insofar as it eliminates the use of an outer sliding cylinder and itself covers the slots in conduit 6 from within.

In Fig. 14 is also shown valve housing 31 of different form representing in substance nothing else but a conduit with enlarged end from which extends conduit 6.

My invention may be used not only as an automatic stop device for liquid, but may also be employed as an automatic siphon. My device usually is used in connection with a flexible conduit or hose as indicated at 14 in Fig. 7.

When the container 15 is to be emptied, the hose is placed into the container so as to be submerged in liquid 16. Then my device is placed in substantially horizontal position so that the ball 7 is unseated. By doing so, the air contained in the tube is permitted to escape and the tube is then automatically filled by the liquid 16 to the height of the level of the liquid. Then my device is turned with its normally lower or outer end upward whereby the ball 7 closes the inner reduced end of the housing.

While holding my device in this inverted, substantially vertical position with the ball closing the inner seat, tube 14 is paid out from the container 15 and my device is lowered below the level of liquid 16, and at this moment my device is tipped to its normal position, whereby the ball falls toward and closes the opposite reduced end of the housing.

When the valve is lifted from its lower seat, the liquid will automatically flow from the tube.

There is another way of siphoning the liquid out of the container 15. Tube 14 is again placed into the container while my device is held in inverted position, that is with its normally lower end up. Now a part of the rubber tube near my device, is pressed between the fingers and palm of the hand a few times which causes the air to be expelled from within the tube. At each pressing of the tube, the expelled air lifts ball 7 from its seat and automatically closes when the pressure exerted upon the tube ceases.

By repeating this operation a partial vacuum is formed within the tube which finally will result in sucking the liquid into the tube, due to the pressure acting upon the surface of the liquid in the container.

When the liquid finally reaches the valve 7, it lifts the same and begins to flow. At this moment my device again is turned to its normal downward position whereby ball 7 closes the lower reduced portion of the housing.

It is obvious that my device may be designed in still other ways to serve the purpose for which it is intended, and I, therefore, reserve for myself the right to make changes, improvements on my invention or design it in different manner to suit various conditions which may arise.

Having thus described my invention, I claim:

1. In a double-acting automatic valve, a cylindrical valve housing, a pair of cylindrical conduits associated therewith and extending with one of their ends into said housing, a valve provided in said housing and adapted to play between the ends of the conduits which are associated with said housing, said conduit ends providing seats for said valve, means for operating said valve, and means for keeping said valve in open position when desired.

2. In a double-acting gravity valve for use in connection with siphons, a conduit intercepted by a valve housing, a double-acting valve within the housing adapted to close either end of said housing, means for facilitating the valve to assume an open position, and means for keeping the valve open when desired.

3. A new article of manufacture, comprising in combination, an intersected conduit, a valve housing of larger dimension than the said conduit associated therewith at its intersected portions, said intersected portions forming valve seats, a valve within said housing adapted to contact with either of said seats depending upon the position in which the article is held, and means for unseating said valve from one of said seats when desired.

4. A new article of manufacture, comprising in combination, a valve housing, conduits of smaller dimensions than the said housing associated therewith said housing forming an enlarged chamber between the ends of the conduits, a valve within that chamber adapted to close either of its open ends depending upon the position of the article, and means for keeping the valve in neutral or non-closing position when desired.

5. An automatic valve, comprising a valve housing with reduced extended ends, a valve provided therein, valve operating means adapted to be actuated from without the housing and adapted to support the housing, said valve adapted to close one of the housing ends when the other housing end is disposed at any desired position above the former, to close the said other housing end when the first mentioned end is disposed at any desired position above this said other housing end, and to be in neutral or non-closing position when the housing is suspended by way of said valve operating means.

6. An automatic stop device for liquid, comprising in combination, a housing having reduced ends, a valve within the housing adapted to close either of the latter's ends, valve operating means in slidable engagement with said housing and adapted to keep the valve in non-closing position when the housing is supported by way of said valve operating means, and permitting the valve's automatically assuming a closing position when the housing is lifted, and means for keeping said valve operating means in a position similar to that assumed when said housing is supported by the latter, when so desired.

7. In combination with a conduit for liquid, a device comprising a tubular valve housing, open and reduced at both ends, a valve within the housing normally adapted to close one of the reduced ends when said liquid tends to flow in one direction and to close the other reduced end of the housing when the liquid tends to flow in opposite direction.

8. In combination with a liquid conduit, a check valve normally adapted to automatically close in one position when the liquid tends to flow in one direction, and to close in reversed position when the liquid tends to flow in opposite direction.

9. A device for automatically stopping and manually starting the flow of liquid, comprising a valve chamber having reduced ends, a freely movable double acting valve within the chamber adapted to be operable through one of the reduced ends of the housing, and independent means not connected with said valve for effecting its operation.

10. A device for automatically stopping and manually starting the flow of liquid comprising a valve housing, a valve therein adapted to close either end of the housing, said housing having supporting means independent of said valve disposed without and adapted to keep said valve in non-closing position when the housing is supported by said means, and permit the valve's automatically assuming a closing position when said housing is lifted.

11. In a siphon device for starting and automatically stopping the flow of liquid, comprising a valve housing, a double acting valve adapted to close one of the housing ends when suspended in normal position and to close the other housing end when its position is inverted, and means for operating said valve from without the housing.

12. In combination with a flexible siphon conduit, a device comprising a tubular valve housing open at both ends, a valve within the housing adapted to close one of the ends when fluid tends to flow in one direction, and to close the other end when fluid tends to flow in the opposite direction.

13. In combination with a siphon conduit, an automatic valve device comprising a tubular valve housing open at both ends, a valve within the housing adapted to close either end of the housing toward which fluid may tend to flow.

14. In combination with a flexible siphon conduit, of an automatic device having a single double seated valve adapted to open automatically when pressure is applied to the conduit for expelling air and to automatically close when the pressure on said conduit is released, so that alternative pressure and release will permit atmospheric pressure to raise the liquid to be siphoned in said conduit to the device.

15. The method of siphoning liquid which consists in expelling the air from a siphon conduit by pulsating pressure upon said conduit together with the use of a single double seated check valve adapted for the purpose.

16. The method of siphoning liquid which comprises inserting one end of a flexible siphon conduit in the liquid, attaching to the other end of the conduit a device which is adapted to restrain the flow of fluid in either direction, holding the device with its free end up and pumping the liquid from the container to the device by alternatively pressing and releasing a portion of the conduit adjacent the device.

Signed at New York, in the county of New York, and State of New York, this 10th day of September A. D. 1920.

CARL SCHNEIDER.